United States Patent [19]
Sudmeier

[11] 3,820,010
[45] June 25, 1974

[54] SUBSURFACE CONTINUOUS-WAVE EXPLORATION SYSTEM

[76] Inventor: Gustav H. Sudmeier, 2708 Torrance Blvd., Torrance, Calif. 90503

[22] Filed: Mar. 11, 1971

[21] Appl. No.: 123,286

[52] U.S. Cl............................................. 324/.5 R
[51] Int. Cl. ......................................... G01n 27/78
[58] Field of Search ............ 324/.5 A, .5 AC, .5 G; 73/152

[56] References Cited
UNITED STATES PATENTS

| | | | |
|---|---|---|---|
| 3,060,371 | 10/1962 | Townsend.......................... | 324/.5 G |
| 3,411,070 | 11/1968 | Anderson........................... | 324/.5 G |
| 3,508,438 | 4/1970 | Alger................................. | 324/.5 G |

*Primary Examiner*—Michael J. Lynch
*Attorney, Agent, or Firm*—Nilsson, Robbins, Bissell, Dalgarn & Berliner

[57] ABSTRACT

A system for providing data on the content of subsurface formations on the basis of the magnetic resonance of certain atomic structures of interest. The system incorporates a mobile unit for moving a source of directional electromagnetic radiation along the earth's surface, directing the radiation substantially vertically into the earth. A probe senses the energy content of the radiated energy pattern (including reflections) to detect distance-related changes which are indicative of groups of atom portions of interest. The sensed radiation is plotted along with a gamma radiation plot for an interpretation indicative of the subsurface formation content.

7 Claims, 7 Drawing Figures

PATENTED JUN 25 1974 3,820,010

INVENTOR
Gustav H. Sudmeier
BY
NILSSON, ROBBINS, WILLS & BERLINER
ATTORNEYS

PATENTED JUN 25 1974 3,820,010
SHEET 2 OF 2
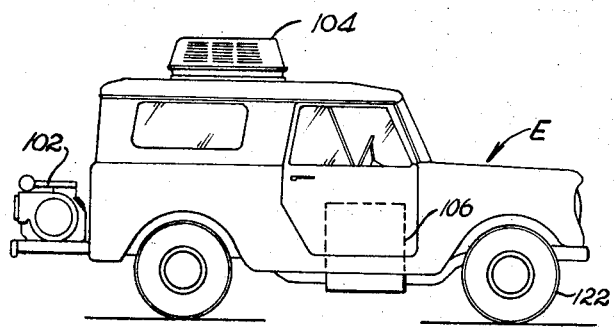
Fig. 4.
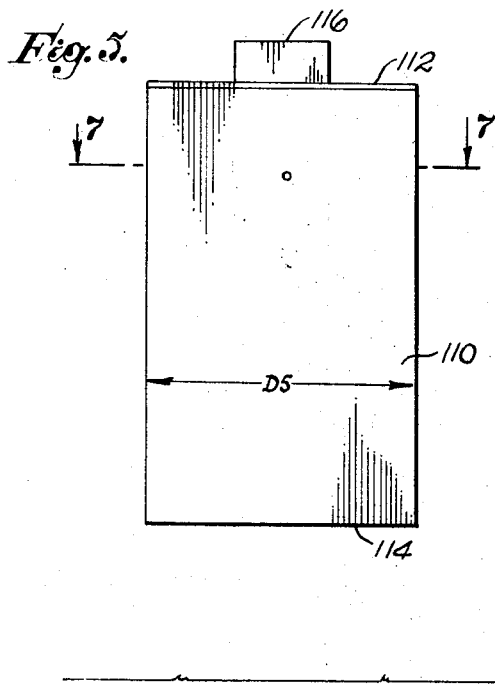
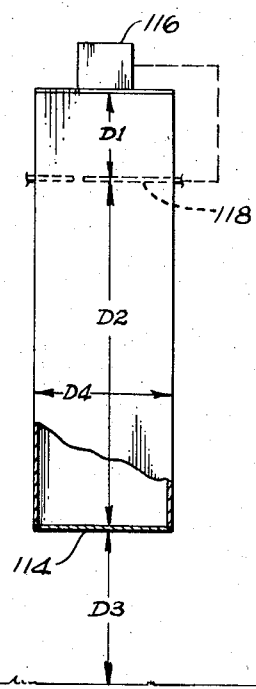
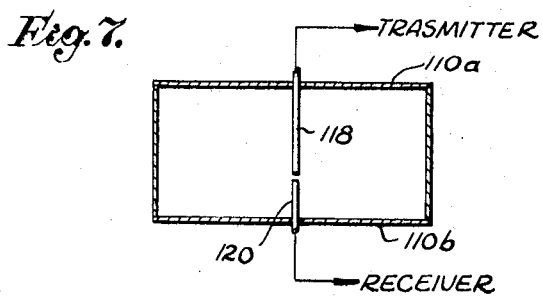
INVENTOR.
GUSTAV H. SUDMEIER
BY
NILSSON ROBBINS WILLS & BERLINER
ATTORNEYS 3,820,010

SUBSURFACE CONTINUOUS-WAVE EXPLORATION SYSTEM

BACKGROUND OF THE INVENTION

It has long been recognized that certain atomic structures possess a characteristic magnetic resonance, which may be useful in chemical analysis. Principles of such chemical analysis are set forth in U.S. Pat. No. 2,561,489 (Bloch and Hansen) entitled Method and Means for Chemical Analysis by Nuclear Inductions.

In general, techniques for analysis based on magnetic resonance have been found useful in various atomic quantum systems including those involving various atom portions, as for example nuclei. Specifically, one detailed system is disclosed in U.S. Pat. No. 3,068,399 (Bloch, Packard and Shoolery) entitled Gyromagnetic Resonance Method and Apparatus. Essentially, that system involves the application of a first magnetic field (oscillating at the Larmor frequency of one group of atom portions) to accomplish a resonant condition, and the application of a second magnetic field that is angularly displaced from the first (oscillating at the Larmor frequency of another group of atom portions) while sensing the precession of the first group on the basis of induced voltage. Thus, the system involves the application of two radio frequency fields which are angularly offset to a sample, while observing the sample by an induced voltage. Consequently, although effective for analysis, it is apparent that such systems are quite limited in relation to the exploration of subsurface formations in situ.

Apparatus has been proposed specifically for investigating subsurface formations on the basis of the magnetic resonance characteristics of atomic structures. For example, one form of such a system is shown and described in U.S. Pat. No. 3,411,070 (Anderson) entitled Subsurface Surveying Apparatus and Method Using a Composite Electro-Magnetic Energy Wave. In that system, a carrier wave (which is a harmonic of the characteristic magnetic resonance of the atomic structure under investigation) is modulated at a frequency that is a sub-multiple of the characteristic magnetic resonance frequency. The signal is then transmitted and a receiver provides an output, the content of which is identified as indicative of the formation content. The system is somewhat complex in requiring modulation and the selection of two frequencies to accomplish the composite energy wave. The modulation of signals also sometimes results in spurious components which may present difficulties in a sensitive instrumentation system.

In general, the system hereof is based upon the discovery that reliable data is available on the characteristics of subsurface formations, with the use of a simple sinusoidal, continuous electromagnetic wave of somewhat critical frequency to energize the formation. More specifically, applicant's system utilizes electromagnetic energy of radio frequency, which is directionally radiated into the earth at relatively lower levels of power. The frequency of the radiation is established as a multiple of the magnetic resonant frequency of the atomic structure of interest, which multiple must be at least of very high frequency for effective penetration into the earth. The presence of a substantial quantity of the atomic structures of interest is manifest by an intensification of the electromagnetic energy in the directional pattern coupled with gamma ray indications, in the case of hydrocarbon. It is recognized that the intensification may involve reflected or resonant oscillatory conditions whereby radiation levels intensify. The use of the system in a mobile manner enables the detection of incongruities by radiation-intensity amplitude changes with reference to distance.

BRIEF DESCRIPTION OF THE DRAWINGS

The drawings, disclosing illustrative embodiments of the present invention which serve to present the various objectives and advantages thereof, are as follows:

FIG. 4 is a side elevational view of another mobile unit constructed in accordance with the present invention;

FIG. 5 is a side elevation of the antenna of the unit of FIG. 4;

FIG. 6 is a sectioned front elevation of the antenna of FIG. 5; and

FIG. 7 is a horizontal sectional view taken along line 7—7 of FIG. 5.

DETAILED DESCRIPTION OF THE ILLUSTRATIVE EMBODIMENT

Figure 1:
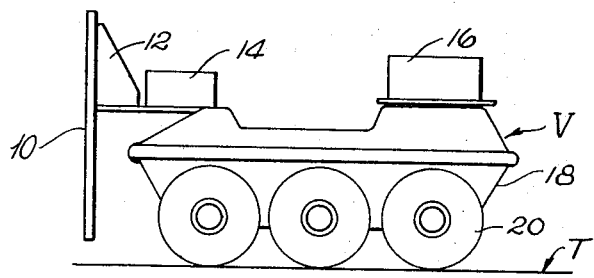
FIG. 1 is a side elevational view of a mobile unit constructed in accordance with the present invention.

Referring initially to FIG. 1, a vehicle V is represented on a Terrain T the underlying formation of which is to be explored. In the exploration of the formation underlying the terrain T, the vehicle V moves in relation thereto while transmitting a continuous-wave, radio frequency, electromagnetic radiation pattern into the earth's surface. Specifically, the pattern is provided from an antenna structure 10 which is highly directional and oriented to radiate a substantially-vertical pattern, into the earth's surface as defined by the terrain T.

The antenna structure 10 is offset from a body 18 of the vehicle V and is held thereon as generally indicated by a support bracket 12. Housing units 14 and 16 are carried upon the body 18 of the vehicle V, which in turn is supported upon a running gear 20 including wheels and so on in accordance with any of a variety of well known vehicular techniques. The vehicle V includes an engine (not shown) for propulsion, as so well known in the art that a detailed showing is unnecessary.

The housings 14 and 16 contain an electronic system for energizing the antenna structure 10 as well as for sensing natural gamma radiation and the energy level in the pattern of electromagnetic radiation that is developed by the antenna structure 10. The detailed components of the electrical system are considered below with reference to FIG. 2. However, generally, as the vehicle V moves across the terrain T, the antenna 10 radiates a pattern of electromagnetic energy which is directed into the earth, through the surface indicated by the terrain T. The system as depicted in FIG. 1 senses the energy content of that pattern. That is, the continuously-transmitted (continuous wave) electromagnetic radiation pattern is sensed and may comprise reflections, as from a resonant condition which is selectively responsive to a predetermined atomic structure in the subsurface formation. As indicated above, the frequency of the radiated energy is directly related to the predetermined substance or atomic structure under investigation. Accordingly, variations in the intensity of radiation appearing in the pattern from the antenna structure 10 as related to distance along the surface of the terrain T manifest demarcations in the quantity of the predetermined atomic structure under investigation. As suggested above, and as considered in greater detail below, such indications and their interpretation are enhanced by a co-related indication of natural gamma radiation.

Figure 2:
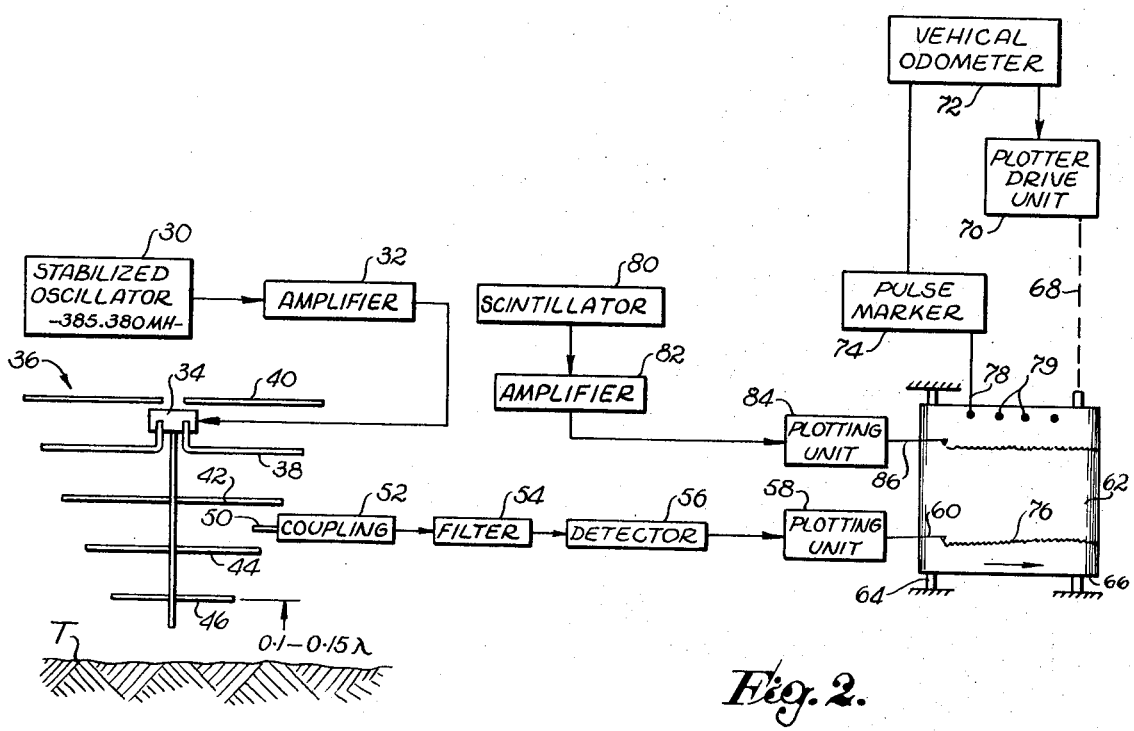
FIG. 2 is a block and schematic diagram of the electrical operating system as provided in the unit of FIG. 1.

Referring now to FIG. 2, there is shown a stabilized oscillator 30 which may take any of a variety of well known forms for providing a signal that is highly stable at a predetermined frequency. The oscillator 30 may, for example, by crystal stabilized. The signal from the oscillator 30 is applied through an amplifier 32 to a coupling unit 34, serving an antenna 36 as somewhat generally designated.

In the illustrative embodiment, the antenna 36 comprises a form of Yagi, including a radiating element 38, a reflector 40 and a plurality of directors 42, 44 and 46 which are spaced apart along a plane, at intervals of approximately 0.1 to 0.15 wavelength of the signal provided from the oscillator 30.

It is to be noted that the antenna 36 (embodied in the antenna structure 10, FIG. 1) is mounted in an insulating support structure (not shown) so that the lower director 46 is positioned above the level of the terrain T (FIG. 2) by a distance of between substantially 0.1 to 0.15 wavelength of the signal provided from the stabilized oscillator 30. The particular supports for the elements of the antenna 36 may be in accordance with established practice in the RF antenna art.

The antenna structure 10 (FIG. 1) also incorporates a sensing element or probe 50 (FIG. 2) which is located in close proximity with the director elements 42, 44 and 46. It is to be appreciated that the form of antenna structure utilized is subject to considerable variation and further in that regard various probes in the form of the sensor probe 50 may be utilized as well known in the prior art.

The stub or probe 50 is connected through a coupling 52 and a filter 54 to an integrator or detector 56. The coupling 52 may take any of a variety of forms as well known in the prior art for providing the sensed signal through the filter 52 to the detector 56. The filter 54 may comprise a tuned amplifier, operating at the predetermined signal frequency. Alternatively, in some embodiments of the system the filter 54 may be omitted or replaced by a broad-band amplifier.

The detector 56, receiving the output from the filter 54, provides a signal level which is representative of the radiation intensity sensed by the stub probe 50. That output tends to be substantially stable when the mobile system is stationary. The detected electromagnetic signal is an analog of the radiation sensed and varies with traversal over a formation to manifest formation content.

The detected signal (from the detector 56) is applied to a plotting unit 58 which actuates a marker 60 operating along a substantially vertical path (as shown) on a supported recording medium 62, e.g., paper. The recording medium 62 is provided in a roll form and is transported from a spool 64 to a driven spool 66. The driven spool 66 is coupled, as indicated by a dashed line 68, to a plotter drive unit 70 which is actuated by a vehicle odometer 72 incorporated in the mobile vehicle V (FIG. 1). The odometer 72 also actuates a pulse marker 74 at predetermined intervals of distance to provide indications 79 of distance, scaled on the recording medium 62. Thus, an analog plot 76 of the detected signal is accomplished on the medium 62 based upon a distance scale as indicated by marks 79.

As suggested above, a gamma-radiation plot is usefully important in combination with the plot 76. In the system as illustratively shown in FIG. 2, a scintillator 80 provides a natural gamma signal which is representative of observed gamma radiation. The gamma signal, as sensed, is amplified by an amplifier 82 and supplied to drive a plotting unit 84, which in turn actuates a plotting marker 86. The marker 86, as depicted in FIG. 2, moves or swings in a substantially-vertical path to accomplish an intensity plot with the earth-terrain distance-scaled horizontal movement of the medium 62 as described above.

Considering the operation of the system of FIG. 2 in somewhat greater detail, an initial determination is made of the atomic structure that is to indicate the substance of interest. Specifically, for example, in the event that the substance of interest is primarily hydrocarbons in the form of crude oil and natural gas, borne in subterranean formations, the atomic structure of interest may be selected as the carbon thirteen isotope, i.e., $^{13}C$. That atomic structure has a magnetic resonance frequency of 10.705 MHZ. Thus, one factor is established for determining the operating frequency for the system.

As indicated above, it has generally been found desirable to operate at levels of at least very high frequency in order to penetrate subsurface formations. Specifically, although the value may vary substantially with, the nature of the formation, its moisture content, and so on, it has generally been determined that operation of the system should be above a threshold frequency of 184 MHZ. Consequently, in the assumed example, effective operating frequencies are those above 184 MHZ which are multiples of the selected resonant frequency e.g., 10.705 MHZ.

As a result of considerable experimentation with an embodiment of the system hereof, it has been determined that in the example under consideration, a simple, sinusoidal operating frequency of 385.380 MHZ is particularly effective. That frequency is the thirty-sixth harmonic of the magnetic resonance frequency for the structure $^{13}C$. An operating frequency of 385.380 MHZ is sufficiently low to avoid the complexities of microwave equipment, yet is sufficiently high to effectively penetrate subsurface formations.

Another operating specific of the system relates to the power level. In that regard, initial conseration may suggest high power levels as obviously advantageous. However, an embodiment of the system hereof has established effective operation at relatively-low levels of power. Accordingly, although the level of power employed may vary widely depending upon the specific components used in the system, the substance of interest, the nature of the terrain and so on, it has been discovered that power levels below 100 watts are effective so long as frequency stability and selection are proper and the signal is a simple, pure sinusoidal waveform.

In addition to tuning the system by selecting the frequency of the oscillator 30 and adjusting to a desired power level, other preliminary adjustments are required. Specifically, upon positioning the vehicle V at the starting point of a traverse over a terrain, the electrical system as depicted in FIG. 2 is energized resulting in the actuation of the markers 60 and 86 to initial starting positions. In the event that such positions are extreme (offscale in either direction) it may be desirable to adjust the markers to a mid-scale position. With that adjustment, the system is ready for actual use by movement over the terrain under investigation.

As the vehicle V (FIG. 1) moves across the terrain T, minor variations in the energy level sensed by the probe 50 (FIG. 2) are to be expected as typically occurs in geophysical exploration systems. However, upon encountering a border of the substance of interest contained in the formation below, a significant change occurs in the energy level sensed by the probe 50. As indicated above, the precise scientific phenomena is not completely understood; however, it appears that an atomic structure having a particular magnetic resonance frequency (subjected to the earth's magnetic field, as well as various continual powerful radio fields) is activated by an electromagnetic radiation pattern of the particular magnetic resonance frequency. Such actuation of atomic structures in a significant geological deposit, results in a condition wherein the energy content of the radiation pattern, as sensed by the probe 50, increases in a marked manner. Accordingly, the system hereof may be effectively utilized to investigate and define the location of substances of interest as contained within subsurface formations.

Figure 3:
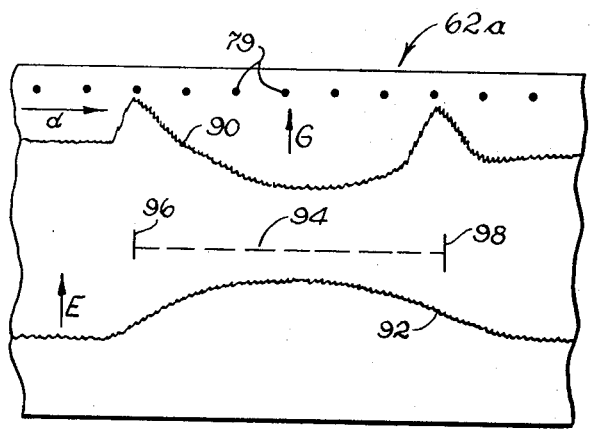
FIG. 3 is a graph illustrative of the graphs provided by the system of FIG. 1.

Considering the example of oil exploration in further detail, reference will now be made to FIG. 3 for a detailed consideration of an exemplary plot as provided by the system of FIG. 2 embodied in the unit as depicted in FIG. 1. FIG. 3 shows a section 62a of the recording medium 62 (FIG. 2) on which, distance is scaled by the marks 79, detected gamma radiation G is indicated by a plotting line 90 and detected electromagnetic radiation is indicated by a plotting line 92. Considering the plotting lines 90 and 92, a defined demarcation is indicated over the space of a dashed line 94. Specifically, at the leading edge 96 of the line 94, a peak has been manifest in the gamma radiation and a somewhat-gradual increase in the electromagnetic radiation has been manifest. At the termination 98 of the line 94, another peak is indicated in the gamma radiation while a substantial decrease in the electromagnetic radiation is manifest. The space between the peaks in the gamma radiation plot is below adjacent ambient gamma level.

In general, peaks in gamma radiation appear to occur at borders of oil deposits. Of course, this consideration is general and subject to many variations as the presence of natural sources of gamma radiation. However, it appears that subterranean oil deposits tend to present an obstacle to gamma radiation with the result that some intensification thereof frequently develops at the borders of such deposits. That information, as manifest by the plotting line 90, is related to the plotting line 92 in the sense that the intensified level of electromagnetic radiation in combination with a gamma-radiation peak tends to indicate the presence of a subterranean deposit of fluid hydrocarbon.

As indicated above, the operation of the present system requires a very stable, single-frequency signal for transmission and in that regard, the system as disclosed above utilizes a crystal-controlled oscillator as a signal source. To further improve the important stability of the system, the structure may be embodied in a vehicle affording environmental (temperature) control. Such a unit is shown in FIG. 4 and will now be considered.

The enclosed vehicle E may take a somewhat-standard form of wheeled-vehicle embodying an auxiliary power supply 102 and an air-conditioning unit 104. The operating system as depicted in FIG. 2 is housed inside the vehicle E and the radiation pattern, as described above, is transmitted and sensed by an antenna system 106. In the mobile unit as depicted in FIG. 4, considerably-increased stability is provided by the temperature control afforded as a result of the air-conditioning unit 104 and the dimensional stability of the antenna system 106 which is essentially a horn configuration.

In one specific embodiment, the antenna system comprises a rectangular or parallelepiped housing as depicted in FIGS. 5, 6 and 7 including four aluminum walls 110, an aluminum top 112 to define a non-conductive opening that is covered by a non-conductive bottom or dust cover 114. The transmitter power unit 116 is affixed to the top 112 and utilizes the antenna system as a heat sink. The antenna rods are affixed co-axially in faced opposing relationship in the walls 110. Specifically, the transmitting antenna rod 118 is affixed in the wall 110a while the receiving stub 120 is affixed in the wall 110b.

The dimensions of the antenna structure are somewhat critically related to the operating frequency of 385 MHZ and in that sense dimensions D1, D2, D3, D4 and D5 are indicated. Specific dimensions are as follows:

| | |
|---|---|
| D1 | 6 inches |
| D2 | 30 inches |
| D3 | 11 inches |
| D4 | 9 inches |
| D5 | 18 inches |

In a preferred embodiment the walls 110 are formed of ⅜ inch aluminum material while the top 112 is formed of ½ inch aluminum. With the antenna system 106 of such sturdy stable construction, and the electronics system housed in a temperature-regulated environment, the critical frequency stability can be more effectively accomplished and maintained.

It is to be noted that the antenna system 106 (FIG. 4) is mounted in alignment with the wheel tracks of the vehicle E. That is, one of the front wheels 122 of the vehicle E defines a path above which the antenna system 106 moves. As a consequence, the radiation pattern is directed to a more-uniform earth surface in the sense that small earth irregularities and vegetation tend to be somewhat smoothed.

The above examples have been set forth as a specific in order to describe a somewhat-precise operation. However, it is to be understood that the system hereof may be utilized to locate various deposits of atomic structures in co-relation to the magnetic resonance of such atomic structures. Accordingly, the system hereof is not to be defined in terms of the illustrative examples and embodiments set forth above but rather shall be defined by the claims as follows.

What is claimed is:

1. A subsurface continuous-wave exploration system for providing data on the content of subsurface formations, in situ, comprising:
   mobile means including wheels for moving over a formation,
   antenna means having a directional radiation pattern, said antenna means being affixed to said mobile means to orient said directional radiation pattern substantially vertically downward at a track location aligned behind one of said wheels;
   oscillation means carried on said mobile means for energizing said antenna means with an alternating, continuous-wave signal of a single frequency that is at least in the very high frequency range;
   probe means affixed to sense radiant energy in said radiation pattern of said antenna means;
   detector means coupled to said probe means and carried on said mobile means for providing a detected signal indicative of radiation sensed by said probe means;
   and means for manifesting said detected signal including a plotter means coupled to said mobile means whereby to indicate said detected signal in relation to movement of said mobile means.

2. A system according to claim 1, wherein said antenna means has a natural frequency of at least 184 megahertz.

3. A system according to claim 1, wherein said antenna means comprises a horn antenna including means defining a rigid housing open on one side and at least two rods affixed therein.

4. A system according to claim 1 further including radiation detection means for detecting gamma radiation as a gamma signal, carried on said mobile means and wherein said means for manifesting comprises means for plotting said detected signal and said gamma signal in relation to movement of said mobile means.

5. A system according to claim 1 wherein said oscillation means provides a signal of 385 megahertz.

6. A system according to claim 4 wherein said antenna means comprises a horn antenna including means defining a rigid housing open on one side and at least two rods affixed therein.

7. A system according to claim 6 wherein said oscillation means provides a signal of 385 megahertz and said housing substantially has a height of 30 inches, a length of 18 inches and a width of 9 inches and wherein said rods are co-axially aligned and affixed substantially 24 inches above said open one side.

* * * * *